United States Patent
Mahto et al.

(10) Patent No.: US 12,225,077 B2
(45) Date of Patent: *Feb. 11, 2025

(54) SYSTEM AND METHOD FOR LOAD BALANCING IN A MULTITENANT ENVIRONMENT

(71) Applicant: Open Text Holdings, Inc., Menlo Park, CA (US)

(72) Inventors: Anirudh Mahto, Rachi (IN); Ankit Kumar Mahto, Rachi (IN)

(73) Assignee: OPEN TEXT HOLDINGS, INC., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/651,958

(22) Filed: May 1, 2024

(65) Prior Publication Data
US 2024/0283842 A1    Aug. 22, 2024

Related U.S. Application Data

(63) Continuation of application No. 18/161,695, filed on Jan. 30, 2023, now Pat. No. 12,003,578, which is a continuation of application No. 17/470,858, filed on Sep. 9, 2021, now Pat. No. 11,570,236.

(60) Provisional application No. 63/079,894, filed on Sep. 17, 2020.

(51) Int. Cl.
*G06F 15/16*     (2006.01)
*H04L 67/1008*   (2022.01)

(52) U.S. Cl.
CPC ............... *H04L 67/1008* (2013.01)

(58) Field of Classification Search
USPC .................................................... 709/201
See application file for complete search history.

(56) References Cited

U.S. PATENT DOCUMENTS

2017/0344553 A1* 11/2017 Evnine ............. G06F 16/24578

* cited by examiner

*Primary Examiner* — Wing F Chan
*Assistant Examiner* — Andrew Woo
(74) *Attorney, Agent, or Firm* — Sprinkle IP Law Group (57) ABSTRACT

Embodiments provide systems and methods to load balance using tenant affinities. A method includes configuring a load balancer with a set of tenant affinities, the set of tenant affinities including a tenant affinity for each of a plurality of tenants with respect to each of a plurality of computing nodes that provide services to users in a multitenant environment. Load balancing may include receiving a user request, associated with a tenant, for a service provided by the computing nodes, determining a highest tenant affinity computing node for the tenant using the set of tenant affinities and directing the user request to the highest tenant affinity computing node for the tenant.

20 Claims, 4 Drawing Sheets

SYSTEM AND METHOD FOR LOAD BALANCING IN A MULTITENANT ENVIRONMENT

RELATED APPLICATIONS

This application is a continuation of and claims the benefit of priority of U.S. patent application Ser. No. 18/161,695, entitled "System and Method for Load Balancing in a Multitenant Environment," filed Jan. 30, 2023, issued as U.S. Pat. No. 12,003,578, which is a continuation of U.S. patent application Ser. No. 17/470,858, entitled "System and Method for Load Balancing in a Multitenant Environment," filed Sep. 9, 2021, issued as U.S. Pat. No. 11,570,236 on Jan. 31, 2023, which claims the benefit of priority under 35 U.S.C. § 119(e) to U.S. Provisional Patent Application No. 63/079,894, filed Sep. 17, 2020, entitled "System and Method for Load Balancing in a Multitenant Environment," each of which are incorporated by reference herein.

BACKGROUND

A multitenant system may utilize any number of nodes to provide services to users associated with tenants in a multitenant environment. A multitenant system may utilize a load balancer to distribute user requests to nodes.

In a multitenant environment there may be any number of nodes that provide the same services. In one example of load balancing, the load balancer assigns user requests based on which node has the least number of assigned users. For example, for a user request that has not been assigned to a node, the load balancer will assign the user request to the node with the lowest number of associated users, regardless of CPU usage. Based on the order and types of requests received, load balancing in this manner can result in one node primarily providing less CPU intensive services and another node primarily providing highly CPU intensive services.

Therefore, an improved mechanism for load balancing is required.

SUMMARY

Attention is thus directed to the systems and methods for load balancing in multitenant environment disclosed herein.

Embodiments provide systems and methods for load balancing in a multitenant environment. One embodiment a method comprises configuring a load balancer with a set of tenant affinities, the set of tenant affinities including a tenant affinity for each of a plurality of tenants with respect to each of a plurality of computing nodes that provide services to users in a multitenant environment. Load balancing can include receiving a user request from a tenant user computer for a service provided by the plurality of computing nodes, the user request associated with a first tenant from the plurality of tenants, determining a highest tenant affinity computing node for the first tenant using the set of tenant affinities, and directing the user request to the highest tenant affinity computing node for the first tenant.

One embodiment of a system includes a plurality of computing nodes that provide services to users in a multitenant environment and a load balancer with tenant affinity. The load balancer with tenant affinity may comprise a set of tenant affinities, the set of tenant affinities including a tenant affinity for each of a plurality of tenants in the multitenant environment with respect to each of the plurality of computing nodes. The load balancer may further comprise a processor and code executable by the processor. The code may comprise instructions for receiving a user request from a tenant user computer for a service provided by the plurality of computing nodes, the user request associated with a first tenant from the plurality of tenants, determining a highest tenant affinity computing node for the first tenant using the set of tenant affinities and directing the user request to the highest tenant affinity computing node for the first tenant.

Another embodiment includes a non-transitory, computer-readable medium embodying thereon computer code for load balancing. The computer code for load balancing may comprise instructions for configuring a memory with a set of tenant affinities, the set of tenant affinities including a tenant affinity for each of a plurality of tenants with respect to each of a plurality of computing nodes that provide services to users in a multitenant environment. The computer code for load balancing may further comprise instructions for receiving a user request from a tenant user computer for a service provided by the plurality of computing nodes, the user request associated with a first tenant from the plurality of tenants, determining a highest tenant affinity computing node for the first tenant using the set of tenant affinities and directing the user request to the highest tenant affinity computing node for the first tenant.

According to one aspect of the present disclosure, each tenant affinity in the set of tenant affinities is based on a number of users from an associated tenant currently assigned to an associated computing node. More particularly, in one embodiment, each tenant affinity in the set of tenant affinities is a percentage of a total number of users assigned to the associated computing node that are from the associated tenant.

According to another aspect of the present disclosure, the highest tenant affinity computing node for the first tenant is a node, from the plurality of computing nodes, with remaining capacity and that has a highest tenant affinity for the first tenant.

According to yet another aspect of the present disclosure, load balancing may include distributing a first set of user requests to the plurality of computing nodes without using tenant affinity and further implementing load balancing using tenant affinity based on a determination that a tenant affinity threshold has been reached. According to one embodiment, the tenant affinity threshold is a threshold number of user connections to the plurality of computing nodes.

According to yet another aspect of the present disclosure, a load balancer receives the set of tenant affinities from the plurality of computing nodes.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DISCLOSURE

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

As discussed, some load balancing schemes may result in some computing nodes primarily providing less CPU intensive services and other nodes primarily providing highly CPU intensive services, even if all the nodes can provide the same services. For example, there are three computing nodes providing mix of services (serv1-serv20) and serv1-serv10 are less CPU intensive, serv11-serv19 are more CPU intensive and serv20 is highly CPU intensive, prior load balancing schemes may result in assigning a relatively large numbers of users who requested serv20 to the same node such that the node primarily provides the highly CPU intensive services, assigning a relatively large number of users who requested serv1-serv19 to a second and third node, such that the second node and third node primarily provide the less CPU intensive or moderately CPU intensive services. As such, different users may have vastly different experiences in the multitenant environment, with the users assigned to the first node potentially experiencing poorer response times or other deleterious effects of that node primarily providing highly CPU intensive services.

Embodiments described herein may implement tenant affinity as a decision parameter for a load balancer to distribute user requests to nodes that have CPU resources available. According to one embodiment, tenant affinity is based on the number of users from a tenant currently assigned to a node. Even more particularly, the tenant affinity is defined, according to one embodiment, as a percentage of the user base from each tenant with respect to a node. Each node can have an affinity with respect to all tenants. The tenant affinity operates on the assumption that each tenant will use a mixed set of operations (utilizing a mixed set of services). By assigning users from a tenant to the same node (without having to reserve the node for that tenant), it may be more likely that the node will provide a mix of services to users.

Figure 1:
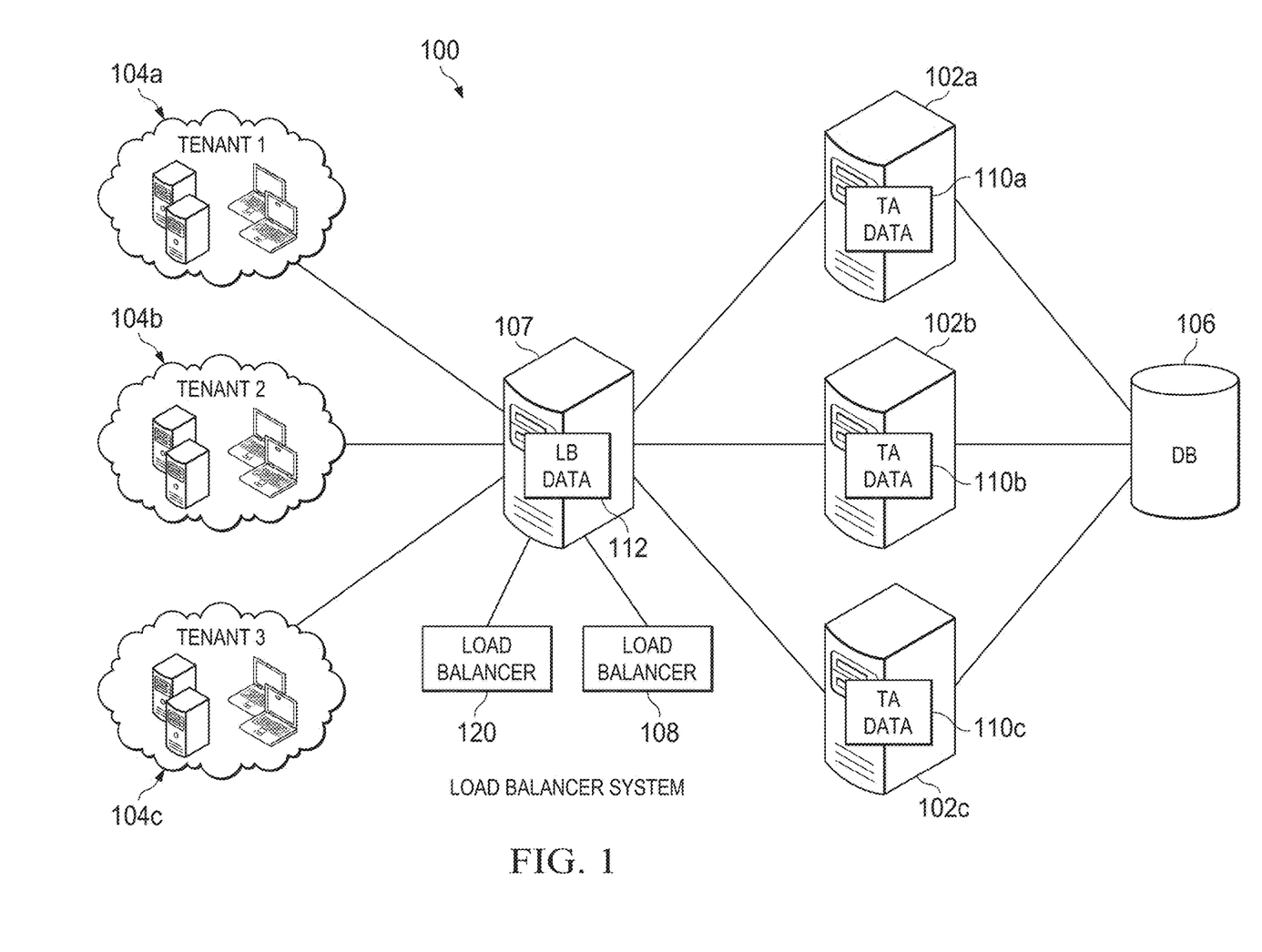
FIG. 1 is a diagrammatic representation of one embodiment of a multitenant environment.

FIG. 1 is a diagrammatic representation of one embodiment of a multitenant environment 100 that comprises a plurality of computing nodes (e.g., computing node 102a, computing node 102b, computing node 102c) that each provide n services to users associated with tenants (e.g., tenant 104a ("Tenant 1"), tenant 104b ("Tenant 2"), tenant 104c ("Tenant 3")) in the multitenant environment. There may be any number of computing nodes providing a mix of any number of services to any number of tenants and each tenant may have any number of associated users. Computing node 102a, computing node 102b and computing node 102c may each provide a mix of services related to database 106.

A load balancer system 107 implements a load balancer 108 that assigns user requests for the services of the computing nodes to the computing nodes based on tenant affinity. According to one embodiment, tenant affinity is based on the number of users from a tenant currently assigned to a node. Even more particularly, the tenant affinity is defined, according to one embodiment, as a percentage of the user base from each tenant with respect to a node. Each node can have an affinity with respect to all tenants.

Table 1, for example, illustrates tenant affinities (as a rounded percentage) for a node in which 45 users are currently assigned to the node from three tenants respectively as follows:

TABLE 1

| Tenant | Users From Each Tenant Assigned to Node | Tenant Affinity |
| --- | --- | --- |
| Tenant 1 | 17 | 38 |
| Tenant 2 | 28 | 62 |
| Tenant 3 | 0 | 0 |

The load balancer assigns a user request to the node with remaining capacity that has the highest affinity for the tenant of which that user is a member.

To this end, each computing node subject to the load balancing can maintain respective tenant affinity data for that node (e.g., tenant affinity data 110a, tenant affinity data 110b, tenant affinity data 110c) and periodically provide the tenant affinity data to load balancer 108. According to one embodiment, each commuting node may calculate the tenant affinities for that node. Thus, tenant affinity data 110a may include tenant affinities for tenants 1-3 for computing node 102a, tenant affinity data 110b may include tenant affinities for tenants 1-3 for computing node 102b, and so on. In such an embodiment, the computing nodes may provide the tenant affinities to load balancer 108 for use in load balancing. The computing nodes may also provide remaining capacities or data usable to calculate remaining capacities to load balancer 108. In addition, or in the alternative, the tenant affinity data of a computing node includes the number of users from each tenant connected to the node. For example, tenant affinity data 110a may include the number of users per tenant from tenants 1-3 assigned to computing node 102a, tenant affinity data 110b may include the number of users per tenant from tenants 1-3 assigned to computing node 102b, and so on. In such an embodiment, load balancer 108 may calculate the tenant affinities from tenant affinity data 110a, tenant affinity data 110b, tenant affinity data 110c received from the computing node 102a, computing node 102b, and computing node 102c, respectively. Other embodiments may include the computing node 102a, computing node 102b, and computing node 102c, informing load balancer 108 of when users connect to and disconnect from the computing node or otherwise providing load balancer 108 with information that can be used to determine tenant affinities and, in some embodiments, remaining capacity. In yet another embodiment, load balancer 108 may receive tenant affinities from another component that calculates the tenant affinities.

In any case, load balancer system 107 may include a memory configured with load balancer data 112 that includes tenant affinity data. Even more particularly, load balancer data 112 comprises tenant affinities for computing node 102a, computing node 102b, and computing node 102c for each of tenant 104a, tenant 104b, and tenant 104c. Load balancer data 112 may also include information, such as the number of users assigned to each computing node and the capacity of each computing node, or other information that can be used to determine if each node has available capacity. By distributing requests based on tenant affinity, load balancer 108 can distribute requests such that each computing node provides services to different tenants, but primarily provides a mix of services to one tenant with a high affinity.

In some embodiments, load balancer system 107 may implement multiple load balancing schemes. For example, load balancer system 107 may comprise a second load balancer 120. According to some embodiments, load balancing based on tenant affinity is not implemented until a tenant affinity threshold is reached. The tenant affinity threshold may be a threshold number of users connected to the nodes of the multitenant system, a threshold tenant affinity value being reached for a tenant or other threshold. Prior to reaching the tenant affinity threshold, load balancer 120 may load balance according to various load balancing schemes known or developed in the art including, but not limited to, load balancing by distributing user requests to the computing node with the least number of assigned users. Once the tenant affinity threshold is reached, load balancer 108 may distribute requests using tenant affinity.

In some embodiments, load balancer 108 may use other considerations in addition to tenant affinity. For example, load balancer (e.g., a doc broker) may limit the computing nodes to which a user request can be distributed based on proximity and distribute the user request to one of proximate nodes based on tenant affinity such that, for each computing node, most of the users assigned to the computing node will be from one tenant having users proximate to the computing node.

Load balancing based on tenant affinity may be used in a variety of environments providing any number of services. By way of example, but not limitation, in a content management environment in which a document broker, such as DOCUMENTUM DocBroker, distributes user requests to content servers, a document broker may determine the content server to which to assign a user based on proximity and load (e.g., tenant affinity) (DOCUMENTUM is a trademark of Open Text Corporation of Waterloo, Ontario, Canada; all trademarks used herein are the property of their respective owners).

Figure 2:
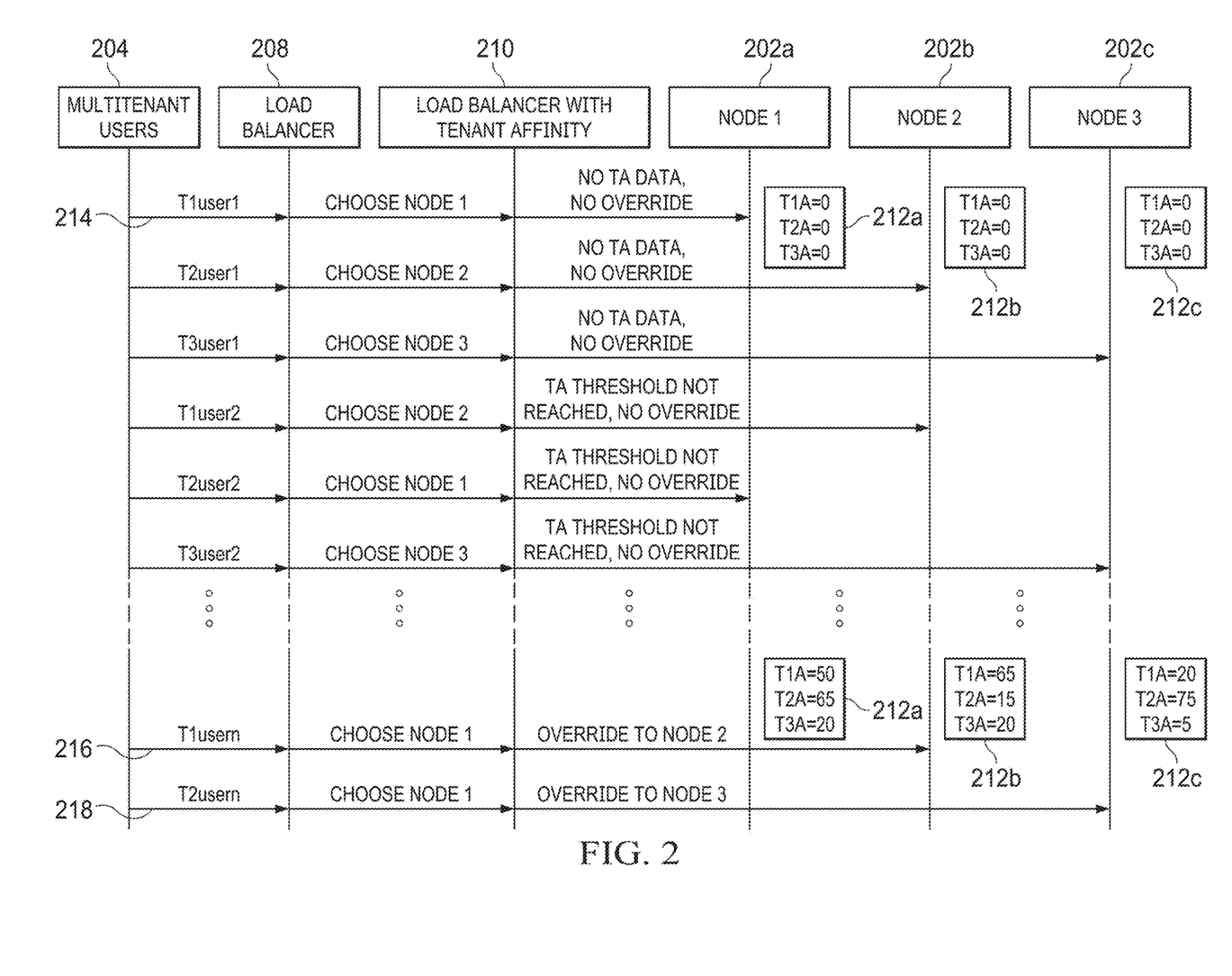
FIG. 2 is a flow diagram illustrating one embodiment of load balancing using tenant affinity.

FIG. 2 is a flow diagram illustrating one embodiment of load balancing using tenant affinity. In this embodiment three computing nodes (computing node 202a, computing node 202b, and computing node 202c) provide services to multitenant users 204 associated with three tenants. Each tenant has a number of users. According to the illustrated embodiment, a multitenant system may implement a first load balancer 208 and a tenant affinity-based load balancer 210. The first load balancer 208 may implement any load balancing scheme known or developed in the art.

The tenant affinities may be calculated by load balancer 210 with tenant affinity, received by the load balancer with tenant affinity from the nodes or other component that calculates the tenant affinities. Tenant affinities can be determined for each tenant with respect to each node. For example, tenant affinities 212a can be determined for computing node 202a, tenant affinities 212b can be determined for computing node 202b and tenant affinities 212c can be determined for computing node 202c. In one embodiment, each computing node (e.g., computing node 202a, computing node 202b, computing node 202c) determines its own set of tenant affinities and provides the tenant affinities to load balancer 210. In another embodiment, each computing node provides the number of users from each tenant connected to that node and load balancer 210 calculates tenant affinities 212a, tenant affinities 212b and tenant affinities 212c. Other embodiments may include computing node 202a, computing node 202b, and computing node 202c, informing load balancer 210 of when users connect to and disconnect from the computing node or otherwise providing load balancer 210 with information that can be used to determine when a tenant affinity threshold is reached and information to determine tenant affinities.

For some period of time there is insufficient information to implement load balancing based on tenant affinity. Thus, when the load balancing system of the multitenant system receives request 214 from Tenant 1, User 1 ("T1user1") for a service from the multitenant system, load balancing occurs according to the load balancing routine implemented by first load balancer. For example, first load balancer 208 may distribute the request based on which computing node offering the service has the fewest assigned users. Load balancing according to first load balancer 208 can continue until a tenant affinity threshold is reached. According to one embodiment, once a user is assigned to a node, subsequent requests from the user are serviced by the same node. For example, the user may establish a session with the node to which the user is assigned and subsequent requests in that session will be serviced by the node to which the user is assigned.

At some point, as determined by the tenant affinity threshold, there is sufficient information to implement load balancing using tenant affinity. For example, the tenant affinity threshold may be considered to be reached once a threshold number of user connections are made to the multitenant system. In some embodiments, since connection requests are distributed by the load balancer, the load balancer system may track the number of connected users. In other embodiments, each computing node (e.g., computing node 202a, computing node 202b, computing node 202c) may report the number of users connected to that node.

Assuming the tenant affinity threshold has been reached when a user request 216 is received from Tenant 1, User n (T1usern), the request is directed to the node with remaining capacity that has the highest tenant affinity for the tenant. In this example, because node 202b has the highest tenant affinity for Tenant 1 when user request 216 is received by the load balancer, load balancer 210 can assign user request 216 from T1usern to computing node 202b. Similarly, since node 202c has the highest tenant affinity for Tenant 1, load balancer 210 can assign request 218 from T2usern to computing node 202c.

Figure 3:
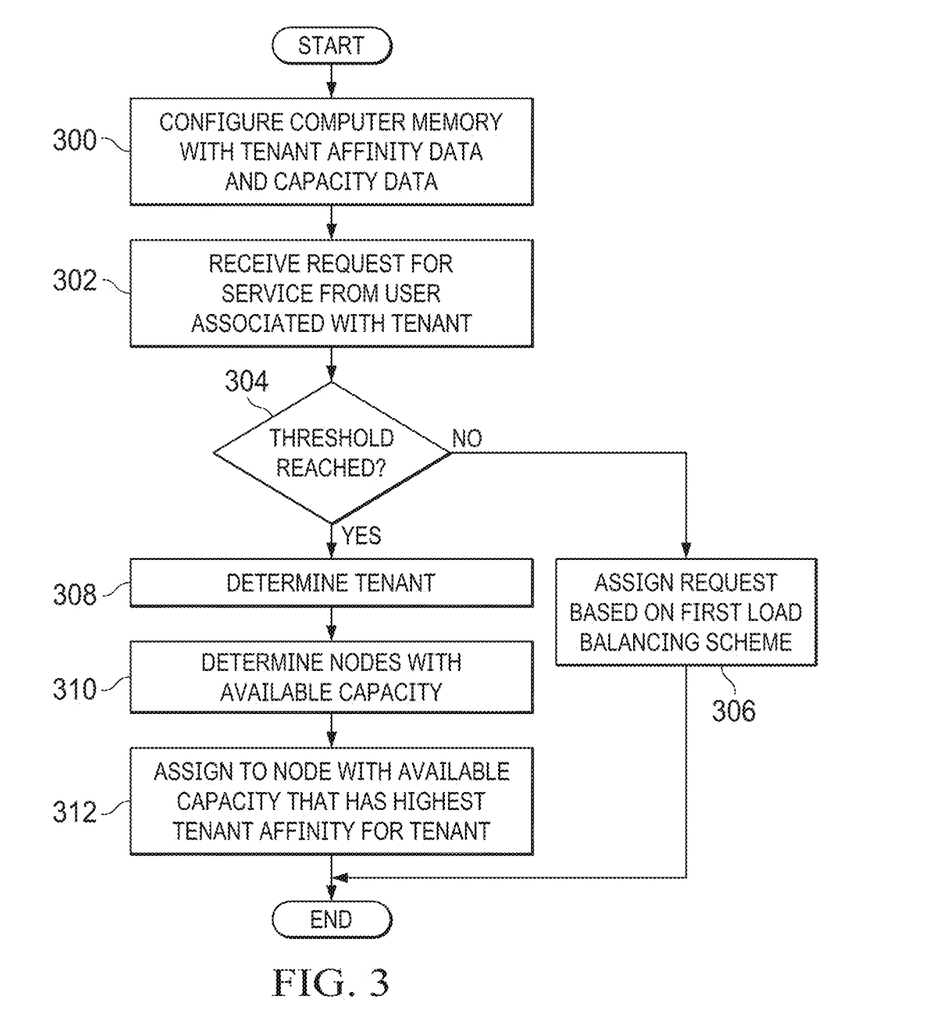
FIG. 3 is a flowchart illustrating one embodiment of a method for load balancing.

FIG. 3 is a flowchart illustrating one embodiment of a method for load balancing. The method of FIG. 3 may be implemented by a load balancing system, such as load balancing system 107.

The steps of FIG. 3 may be performed by a load balancer (e.g., one or more load balancers). In some embodiments, the method of FIG. 3 may be embodied as computer-executable code on a non-transitory computer readable medium.

At step 300, a computer memory used by a load balancer is configured with tenant affinity data and capacity data. The tenant affinity data may include a set of tenant affinities. Even more particularly, the set of tenant affinities may include a tenant affinity for each of a plurality of tenants with respect to each of a plurality of computing nodes that provide services to users in a multitenant environment. In various embodiments, the tenant affinities may be provided to or calculated by the load balancer. The capacity data may indicate or be used to determine whether each computing node has remaining capacity. The capacity data may be provided to or calculated by the load balancer. The tenant affinities and capacity data may be continually updated as, for example, users are assigned to and end sessions with the computing nodes.

At step 302, the load balancer receives a user request for a service. At step 304, the load balancer determines if a tenant affinity threshold has been met. The tenant affinity threshold may be a threshold number of users connected to the nodes of the multitenant system, a threshold tenant affinity value being reached for a tenant or another threshold. If the threshold has not been met, the load balancer implements a first load balancing scheme. By way of example, but not limitation, the load balancer may assign the request to the computing nodes with the least number of assigned users (step 306). If the tenant affinity threshold has been met, the load balancer can determine the tenant associated with the request (step 308) and the computing nodes that provide the service that have remaining capacity (step 310). At step 312, the load balancer assigns the request to the computing node with remaining capacity that has the highest tenant affinity for the tenant (from the computing nodes with remaining capacity that provide the service).

FIG. 3 is merely an illustrative example, and the disclosed subject matter is not limited to the ordering of, or number of, steps illustrated. Embodiments may implement additional steps or alternative steps, omit steps, or repeat steps. By way of example, but not limitation, a load balancer implementing step 306 may be performed for each request to be load balanced and then, if the tenant affinity threshold is met, step 312 may override the results of step 306.

Figure 4:
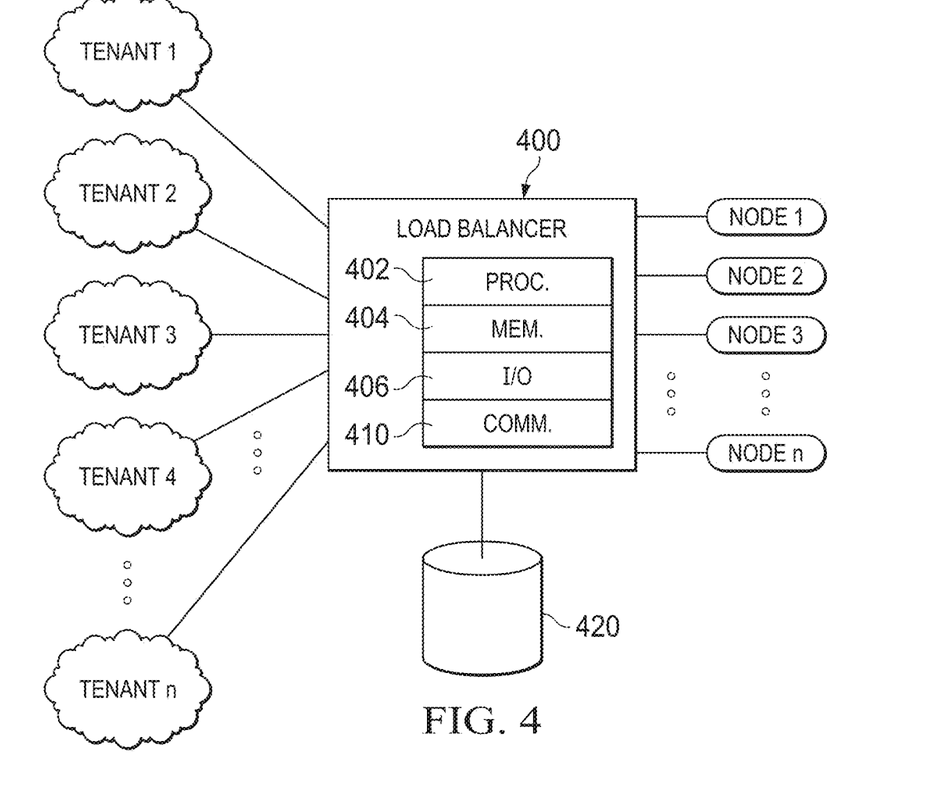
FIG. 4 is a diagrammatic representation of a network environment.

Embodiments of the technology may be implemented on a computing system. Any combination of mobile desktop, server, embedded or other types of hardware may be used. FIG. 4 is a diagrammatic representation of one embodiment of a distributed network computing environment where embodiments disclosed herein can be implemented. In FIG. 4, there are n tenants t1-tn, each tenant having a corresponding set of n users. There are n nodes, each node supporting n services (serv1, serv2, serv3 ... servn). It can be noted that 'n' may be different for tenants, users, nodes, and services.

A load balancer system 400 is bi-directionally connected to tenant user computers and the nodes by a network (e.g., a local area network (LAN), a wide area network (WAN) such as the Internet, mobile network, or other type of network or combination thereof). The network may represent a combination of wired and wireless networks that a network computing environment may utilize for various types of network communications.

Load balancer system 400, which may be an example of load balancer system 107, may include, for example, a computer processor 402 and associated memory 404. Computer processor 402 may be an integrated circuit for processing instructions. For example, processor 402 may comprise one or more cores or micro-cores of a processor. Memory 404 may include volatile memory, non-volatile memory, semi-volatile memory, or a combination thereof. Memory 404, for example, may include RAM, ROM, flash memory, a hard disk drive, a solid-state drive, an optical storage medium (e.g., CD-ROM), or other computer readable memory or combination thereof. Memory 404 may implement a storage hierarchy that includes cache memory, primary memory, or secondary memory. In some embodiments, memory 404 may include storage space on a data storage array. Load balancer system 400 may also include input/output ("I/O") devices 406, such as a keyboard, monitor, printer, electronic pointing device (e.g., mouse, trackball, stylus, etc.), or the like. Load balancer system 400 may also include a communication interface 410, such as a network interface card, to interface with network 405.

Memory 404 may store instructions executable by processor 402. For example, memory 404 may include instructions executable to implement a load balancer, such as, but not limited to load balancer 108 and load balancer 120, load balancer 208 and load balancer 210, or another load balancer. In some embodiments, load balancer system 400 may represent a cloud computing system that provides a multitenant platform. Load balancer system 400 may represent, for example, a plurality of servers.

Load balancer system 400 may be coupled to a data store 420 that stores data usable by the multitenant platform. According to one embodiment, data store 420 may comprise one or more databases, one or more file systems or a combination thereof. In some embodiments, data store 420 may be a portion of memory 404. As will be appreciated, each computing node may be implemented on a computer system.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A multitenant system comprising:
    a plurality of computing nodes that provide a plurality of services;
    a load balancer system communicatively coupled to the plurality of computing nodes, the load balancer system comprising:
        a memory for storing load balancer data, the load balancer data comprising:
            tenant affinity data, the tenant affinity data comprising tenant affinities for a plurality of computing node-tenant pairs;
            capacity data for the plurality of computing nodes;
        a processor; and
        load balancer code executable by the processor, the load balancer code comprising instructions for:
            receiving a user request for a first service from the plurality of services from a user who is a member of a first tenant;
            limiting the plurality of computing nodes to eligible computing nodes for servicing the user request; and
            assigning, using the load balancer data, the user request to an eligible computing node from the eligible computing nodes that has a highest tenant affinity for the first tenant.

2. The multitenant system of claim 1, wherein the plurality of computing nodes are limited to the eligible computing nodes for servicing the user request based on support for the first service.

3. The multitenant system of claim 2, wherein the plurality of computing nodes are limited to the eligible computing nodes for servicing the user request based on available capacity.

4. The multitenant system of claim 2, wherein the plurality of computing nodes are limited to the eligible computing nodes for servicing the user request based on proximity.

5. The multitenant system of claim 4, wherein the eligible computing nodes for servicing the user request are further selected based on available capacity.

6. The multitenant system of claim 1, wherein the load balancer code is executable to determine the tenant affinities for the plurality of computing node-tenant pairs.

7. The multitenant system of claim 1, wherein the tenant affinities for the plurality of computing node-tenant pairs are based on a number of users from a respective tenant that are assigned to a respective computing node.

8. The multitenant system of claim 7, wherein the tenant affinities for the plurality of computing node-tenant pairs comprise a percentage of a user base of the respective computing node from the respective tenant.

9. A multitenant system comprising:
a plurality of computing nodes that provide a service;
a load balancer system communicatively coupled to the plurality of computing nodes, the load balancer system comprising:
a memory for storing load balancer data;
a processor; and
load balancer code executable by the processor, the load balancer code comprising instructions for:
receiving tenant affinity data with respect to a plurality of tenants from the plurality of computing nodes, the tenant affinity data comprising tenant affinities for a plurality of computing node-tenant pairs;
receiving capacity data from the plurality of computing nodes;
storing the tenant affinity data and the capacity data in the memory as at least a portion of the load balancer data; and
distributing user requests for the service to the plurality of computing nodes using the tenant affinity data and the capacity data received from the plurality of computing nodes.

10. The multitenant system of claim 9, wherein the tenant affinities for the plurality of computing node-tenant pairs are based on a number of users from a respective tenant that are assigned to a respective computing node.

11. The multitenant system of claim 10, wherein the tenant affinities for the plurality of computing node-tenant pairs comprise a percentage of a user base of the respective computing node from the respective tenant.

12. The multitenant system of claim 9, wherein the user requests for the service include user requests from members of a first tenant and wherein distributing the user requests for the service to the plurality of computing nodes using the tenant affinity data and the capacity data received from the plurality of computing nodes comprises:
determining, from the plurality of computing nodes, an available capacity computing node that has a highest tenant affinity for the first tenant from the plurality of tenants; and
assigning the user requests from the members of the first tenant to the available capacity computing node that has the highest tenant affinity for the first tenant.

13. The multitenant system of claim 12, wherein the user requests for the service include user requests from members of a second tenant and wherein distributing the user requests for the service to the plurality of computing nodes comprises:
determining, from the plurality of computing nodes, an available capacity computing node that has a highest tenant affinity for the second tenant; and
assigning the user requests from the members of the second tenant to the available capacity computing node that has the highest tenant affinity for the second tenant.

14. The multitenant system of claim 13, wherein the available capacity computing node that has the highest tenant affinity for the first tenant is a different computing node from the available capacity computing node that has the highest tenant affinity for the second tenant.

15. A multitenant system comprising:
a plurality of computing nodes that provide a service;
a load balancer system communicatively coupled to the plurality of computing nodes, the load balancer system comprising:
a memory for storing load balancer data, the load balancer data comprising:
tenant affinity data, the tenant affinity data comprising tenant affinities for a plurality of computing node-tenant pairs;
capacity data for the plurality of computing nodes;
a processor; and
load balancer code executable by the processor, the load balancer code comprising instructions for:
receiving a user request for the service from a user that is a member of a first tenant from a plurality of tenants;
performing a first load balancing, performing the first load balancing comprising assigning the user request to a first computing node from the plurality of computing nodes according to first load balancing criteria; and
performing a second load balancing, performing the second load balancing comprising assigning, using the load balancer data, the user request to an available capacity computing node, from the plurality of computing nodes, that has a highest tenant affinity for the first tenant.

16. The multitenant system of claim 15, wherein the load balancer code comprises instructions for:
determining that a tenant affinity threshold has been met for the first tenant, wherein the second load balancing is performed for the user request based on a determination that the tenant affinity threshold has been met for the first tenant.

17. The multitenant system of claim 16, wherein the second load balancing is performed after and overrides the first load balancing.

18. The multitenant system of claim 16, wherein the first load balancing assigns the user request to the first computing node based on the first computing node having a least number of assigned users.

19. The multitenant system of claim 15, wherein the tenant affinities for the plurality of computing node-tenant pairs are based on a number of users from a respective tenant that are assigned to a respective computing node.

20. The multitenant system of claim 19, wherein the tenant affinities for the plurality of computing node-tenant pairs comprise a percentage of a user base of the respective computing node from the respective tenant.

* * * * *